Jan. 19, 1926. 1,570,165
I. J. MERRILL
TRAILER
Filed July 23, 1923 3 Sheets-Sheet 2

INVENTOR
Ira J. Merrill
BY
H.L. & C.L. Reynolds
ATTORNEYS

Jan. 19, 1926.

I. J. MERRILL 1,570,165

TRAILER

Filed July 23, 1923   3 Sheets-Sheet 3

INVENTOR
Ira J. Merrill
BY
N. L. & C. L. Reynolds
ATTORNEYS

Patented Jan. 19, 1926.

1,570,165

UNITED STATES PATENT OFFICE.

IRA J. MERRILL, OF SEATTLE, WASHINGTON.

TRAILER.

Application filed July 23, 1923. Serial No. 653,190.

*To all whom it may concern:*

Be it known that I, IRA J. MERRILL, a citizen of the United States of America, and resident of the city of Seattle, in the county of King and State of Washington, have invented certain new and useful Improvements in Trailers, of which the following is a specification.

My invention relates to trailers of that type sometimes called semi-trailers, and which are characterized by having a single axle and pair of wheels.

The object of my invention is to produce a trailer of this type which will be of strong and rigid construction and yet with a flexibility that will permit it to yield under heavy loads, and particularly if such loads are not centrally placed thereon, without danger of breakage of any of the parts due to unsymmetrical rocking of the parts thereon.

My invention consists of certain improvements in the manner of supporting the bolster or bunk upon the springs and in guiding the springs and the bolster carried thereby in its up and down movement, so as to prevent lateral or side swaying, that is, in the direction of the axle.

It consists of further improvements which will be hereafter described and then particularly pointed out in the claims.

I have shown a trailer embodying my invention in the type of construction which I prefer to employ, where the trailer is designed for heavy duty work such as carrying logs or lumber.

Figure 6 shows in perspective the block which forms the under bearing of the pivot connecting the springs and the bolster, the block being shown with its bottom side upward.

Figure 1:
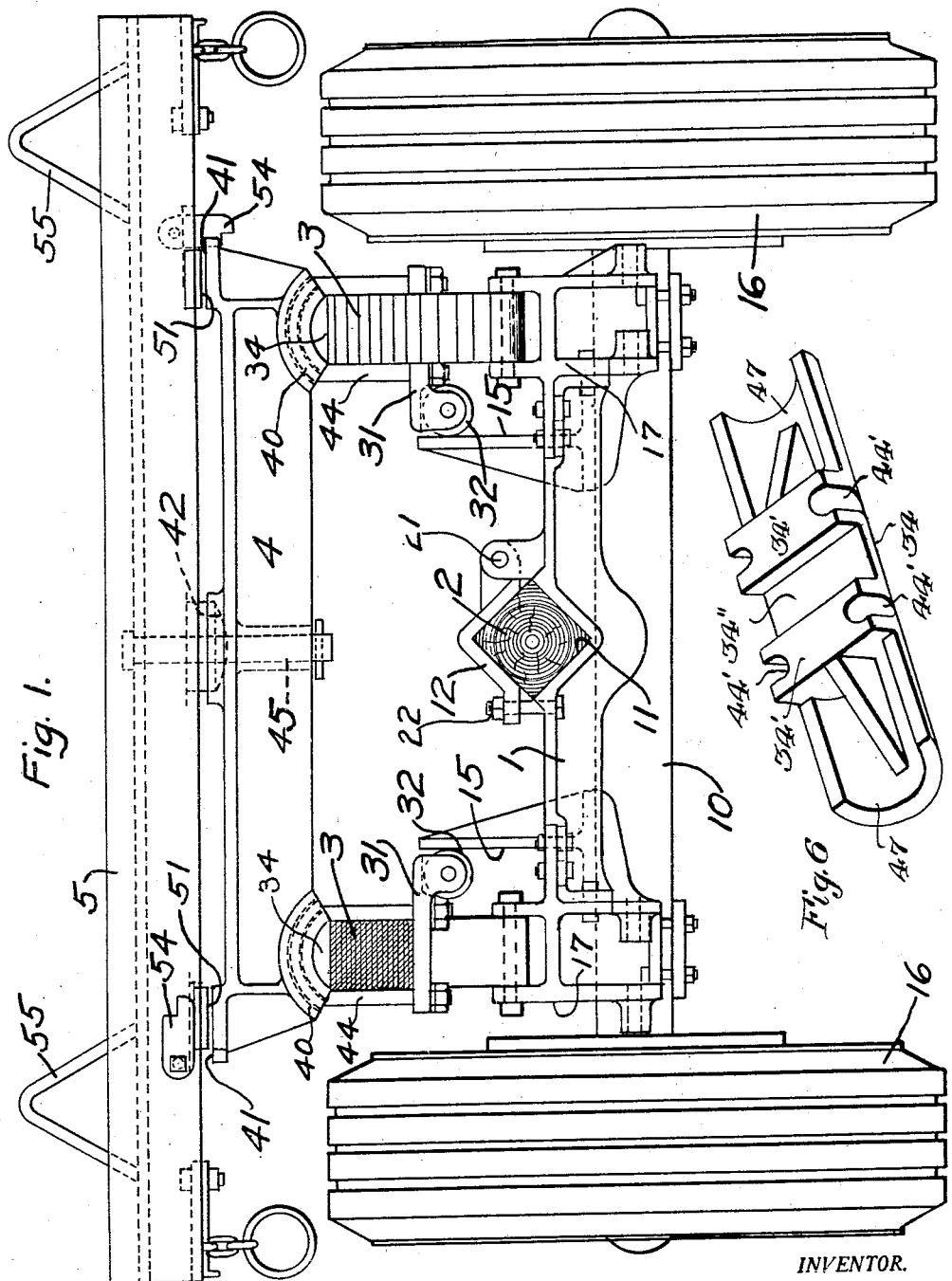
Figure 1 is a rear elevation and partial section of a trailer.
Figure 2:
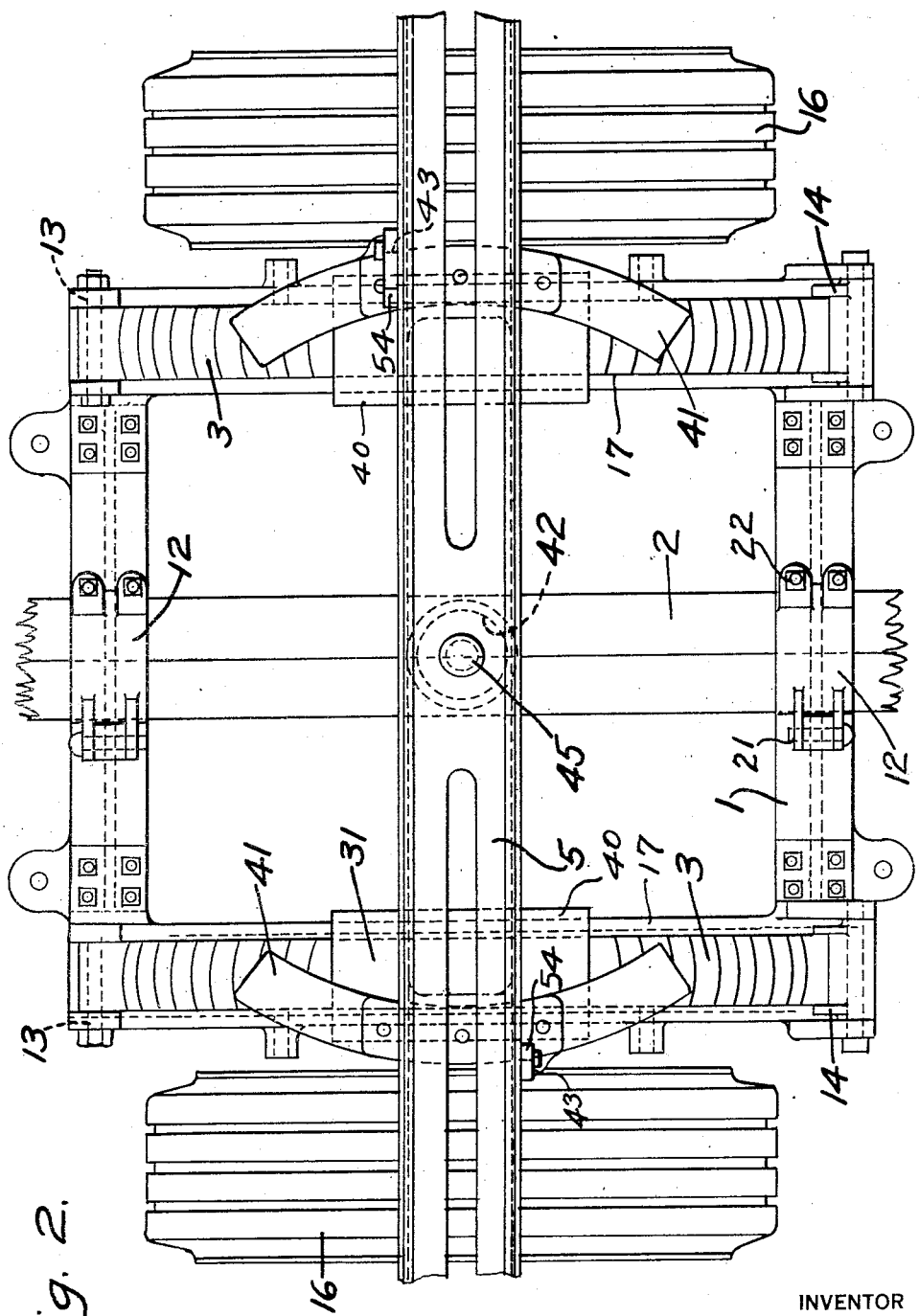
Figure 2 is a top plan view of the same.
Figure 3:
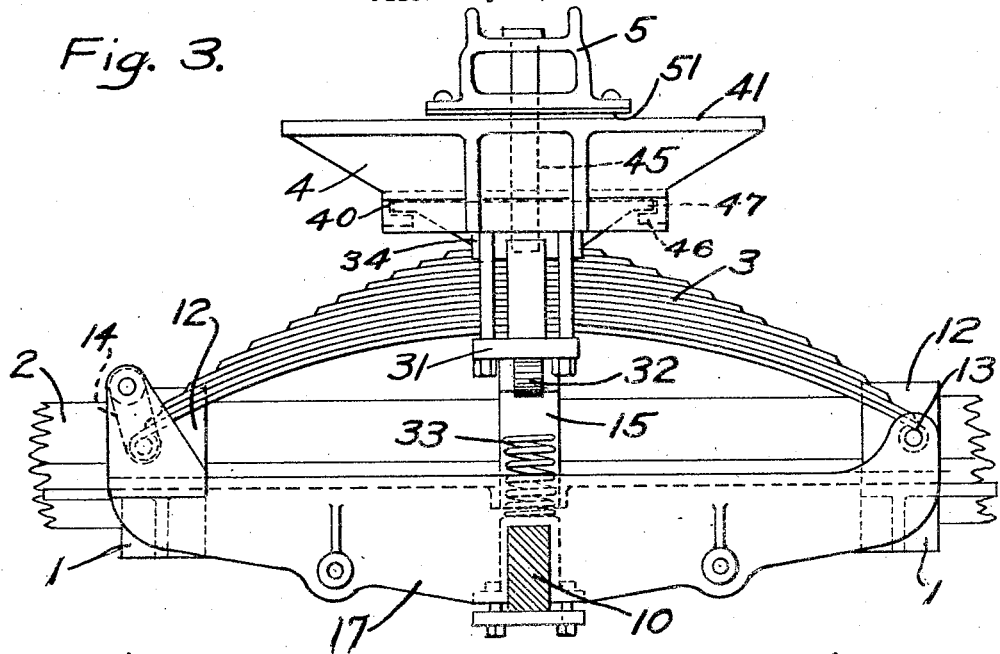
Figure 3 is a side elevation of the trailer showing the wheels removed.
Figure 4:
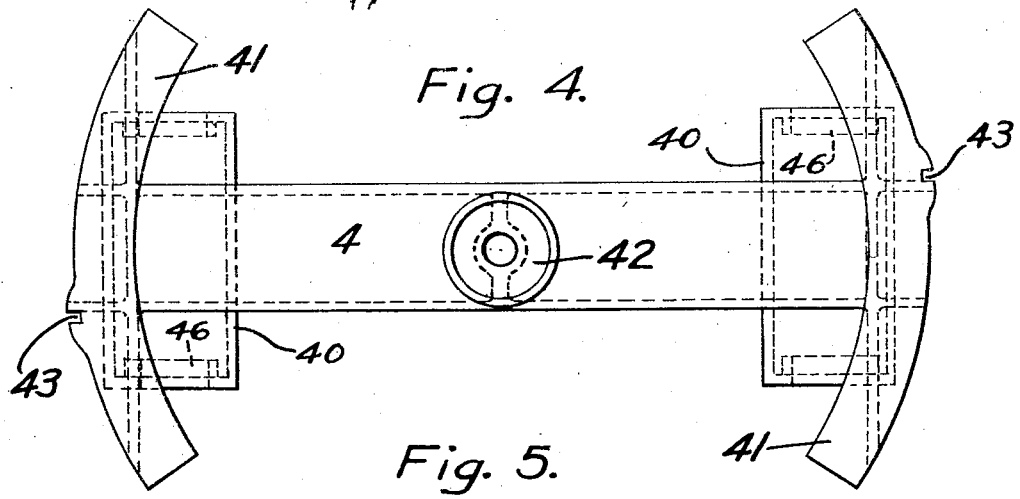
Figure 4 is a top plan view of the bolster.

In the type of trailer to which my invention belongs a single axle 10 is employed and two wheels 16. These may in general be of any suitable type of construction. Mounted upon the axle is a rectangular supporting frame consisting of two transversely extending beams 1 and two longitudinally extending beams 17. The latter beams are placed just inside the wheels and are centrally secured upon the axle in any convenient or suitable manner. The two transverse beams 1 are provided each with a seat 11 centrally placed relative to their length and adapted for the reception of a reach 2. The reach is further secured by means of a plate 12 for each of the beams 1, which plate as illustrated is pivoted at one end by a pivot 21 to ears carried by the beam 1, and has its other end secured to the beam by bolts 22.

The bolster 4 is carried by two semi-elliptic springs 3 which are secured by their ends to the ends of the beam 17, as by a pivot pin 13 at one end and shackle 14 at the other. These springs bow centrally upwards and the bolster is secured thereto at the center of their length.

Figure 5:
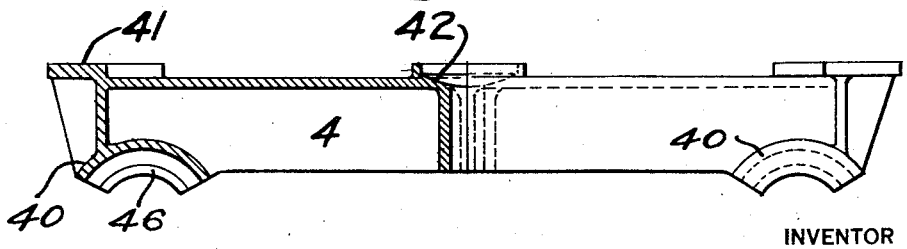
Figure 5 is a side elevation with one end in section of the same bolster.

The bolster is secured to the springs by a sliding or pivot mechanism which will permit rocking action of the bolster upon the spring without distorting any part of either. The means employed for connecting these permits movements equivalent to that about a pivot having an axis extending from front to rear. The special type of means which it is preferred to employ is illustrated in some detail in Figures 1 and 5. The bolster itself is not directly and immediately secured to the spring. A block as 34 is secured to the springs as by U-bolts 44. This block has an upper surface which is a segment of the periphery of a cylinder, the ends 47 of such segments projecting to interlock with a complemental member secured to the bolster. This block preferably has a central solid section cut across by a central channel 34", and end sections 34' which contain grooves 44' into which the U-bolts are received. The bolster has a complemental member in the form of a saddle 40 which on its under surface is rounded to conform to the upper surface of the block 34. This saddle 40, which is a segment of a cylindrical shield, projects at its ends beyond the flange-like ends 47 of the block 34 and has flanges 46 at each end which project downward and then backward towards the center, thus forming a slot in which is held the projecting end flanges 47 of the block 34. This construction forms a joint which will permit rocking movement between the spring and the bolster and yet locks the two together so that they cannot be displaced.

If, during use the bolster is loaded at one side much heavier than the other, the spring on that side is free to depress, the pivot bearing above described permitting such rocking between the two parts as may be necessary without distorting the spring to one side or in any manner twisting it so as to encourage breakage. This is often a matter of considerable importance, as during the application of such a load as logs, the load is often wholly at one end of the bolster, thereby much depressing one spring without materially depressing the opposite spring. Such unequal loading does not, however, produce racking strains tending to break the springs. The connection between the spring and the bolster rocks freely and relieves these parts of breaking strains.

To prevent side swaying of the springs I provide two complemental guide members carried one by the spring and one by the axle and freely movable in vertical position and yet held against movement transversely of the trailer, that is in the direction of the length of the axle. Such means in the form of construction which I prefer, are illustrated in Figure 1. This consists of a post 15 secured to or carried by the axle towards each end thereof, and having a vertical guide face, which face as illustrated is placed toward or facing the wheel. The spring carries an arm or plate 31 upon which is journaled a guide roller 32 which bears against the guide face of the upturned arms 15. This mechanism is duplicated at each side of the trailer. It is evident that any tendency for the bunk and bolster to swing toward one side or the other is resisted by one or the other of these arms 15.

In many kinds of work, particularly that of hauling logs for which my trailer has been especially designed, it is desirable to have a bunk mounted upon the bolster. Such a bunk, 5, is shown. This bunk may in general be of any suitable type of construction. That illustrated is a bunk which has been found very effective and is of a simple type of construction. It is provided with two chocks 55 which are designed to be adjustable lengthwise of the bunk. A king pin 45 and two complemental pivot plates 42 serve as the pivot for such a bunk.

In employing such a bunk side bearing plates 41 carried by the bolster, and 51 carried by the bunk, are employed. These function as any ordinary side bearing plates of cars. At times it may be desirable that the bunk shall be locked in position and not pivoted. To provide for this I have provided each of the side bearing plates 41 with a notch 43 and have mounted upon the side face of the bunk 5 a latch 52 which is pivoted so that when not required it may be swung upwardly and towards the center so as to rest upon the side plate 51 in the position shown at the lefthand side of Figure 1. When it is desired to lock the bunk to prevent turning, these latch bars may be swung outwardly and downwardly in the position shown at the right hand end in Figure 1, in which position they enter slots 43 to hold the bunk rigidly in position.

By providing the sliding guide members represented by 15 and 32, I prevent side racking of the springs and the bunk carried thereby, thus eliminating one of the chief sources of breakage of springs. By providing the rocking or pivoting connection between the bolster and the spring I eliminate the racking effect upon the springs caused by unequal loading and unequal depression of the two springs.

What I claim as my invention is:

1. The combination with a bolster, springs under each end of the bolster and a transversely curved sliding connection between each of the springs and the bolster, the axes of curvature thereof extending in a longitudinal direction and positioned well below the said connection.

2. The combination with a bolster, longitudinally extending springs supporting each end thereof, connections between the springs and bolster permitting limited rocking about longitudinal axes, and guides preventing transverse movements of the springs.

3. The combination with an axle, a pair of side springs carried by the axle, a block above the springs, a clamp plate therebelow, clamping bolts connecting said block and plate and including the springs, a bolster supported at each end from said blocks, a roller carried upon an end of each plate, and vertical guides carried by the axle and having side bearings in contact with the rollers to prevent side sway of the spring.

4. A vehicle having load-supporting springs at each side thereof, bolsters connecting opposite springs, complemental bearing members carried by bolster and springs and having arcuate bearing surfaces having axes extending in a fore-and-aft direction, said bearing members having interlocking parts preventing their separation while freely permitting rocking.

5. A vehicle having fore-and-aft positioned leaf springs at each side, a bolster connecting opposite springs, a pivotal connection between each spring and the bolster comprising two bearing members having complemental cylindrical segmental bearing surfaces with fore-and-aft axes, one bearing member of each pair having circular segment slots receiving the ends of the other member to prevent separation of the bearing members.

6. In a semi-trailer, in combination, an axle, a frame having two side bars located close inside of the wheels and transverse bars connecting the ends of the side bars, the side bars having downwardly opening axle-receiving recesses and the transverse bars having reach receiving recesses, two semi-elliptic springs having their ends supportingly connected with the ends of the side bars, and a bolster connected with the upwardly bowed central portions of the spring.

7. In a semi-trailer, an axle, a rigid frame secured thereto and including spring supporting beams extending from front to rear and centrally secured to the axle just within the wheels, a semi-elliptic spring having its ends secured to the ends of said beams and bowing upwardly, and a bolster secured to the central portions of said springs.

8. A trailer having a pair of load-supporting springs, a bolster supported upon said springs, a connecting member carried by each of said springs and convexly curved upward, and a saddle complemental to each of said connecting members, and resting thereon to slide thereover, said saddles being connected to said bolster.

9. A trailer having a pair of load-supporting springs, a bolster supported upon said springs, a member secured to the upper side of said springs, said member being transversely curved and having forwardly and rearwardly projecting ledges, a saddle curved complementally to and resting upon said member to slide transversely thereover, said saddle being secured to said bolster, and fingers depending from said saddle and extending under said ledges, to prevent separation of the member and its saddle.

10. In a vehicle the combination with an axle, leaf springs supported from the axle and extending in a front-to-rear direction at the sides of the vehicle, a bolster cross-connecting the springs in pairs, a roller and a vertical guide for said roller for each spring, one being fixed relative to the axle and the other fixed relative to the spring.

11. In a vehicle the combination with an axle, leaf springs supported from the axle and extending in a front-to-rear direction at the sides of the vehicle, a bolster, means connecting the bolster with opposite springs to form rocking pivots having pivotal rocking action about fore-and-aft axes, a vertical guide and a roller engaging therewith, one carried by the axle and the other by the spring and preventing side sway of the springs.

Signed at Seattle, King County, Washington, this 27th day of June, 1923.

IRA J. MERRILL.